US012639463B2

(12) United States Patent
Udaya

(10) Patent No.: US 12,639,463 B2
(45) Date of Patent: May 26, 2026

(54) SYSTEMS AND METHODS FOR STORING AND RETRIEVING PUBLIC DATA

(71) Applicant: SAP SE, Walldorf (DE)

(72) Inventor: Sahana Durgam Udaya, Bangalore (IN)

(73) Assignee: SAP SE, Walldorf (DE)

( * ) Notice: Subject to any disclaimer, the term of this patent is extended or adjusted under 35 U.S.C. 154(b) by 212 days.

(21) Appl. No.: 18/531,369

(22) Filed: Dec. 6, 2023

(65) Prior Publication Data

US 2025/0190601 A1     Jun. 12, 2025

(51) Int. Cl.
*G06F 21/62*          (2013.01)
(52) U.S. Cl.
CPC ................................. *G06F 21/6218* (2013.01)
(58) Field of Classification Search
CPC ................................................... G06F 21/6218
USPC ......................................................... 726/27
See application file for complete search history.

(56) References Cited

U.S. PATENT DOCUMENTS

| | | | | |
|---|---|---|---|---|
| 6,564,261 B1 * | 5/2003 | Gudjonsson | ............ | H04L 51/48 |
| | | | | 379/900 |
| 10,664,451 B1 * | 5/2020 | Liao | ..................... | G06F 16/1824 |
| 2002/0083124 A1 * | 6/2002 | Knox | ...................... | G06F 16/10 |
| | | | | 707/E17.01 |
| 2005/0203887 A1 * | 9/2005 | Joshi | ................... | G06F 16/2471 |
| 2007/0156633 A1 * | 7/2007 | Sugita | .................. | G06F 16/957 |
| | | | | 707/E17.112 |
| 2009/0037373 A1 * | 2/2009 | Gilbert | ............... | H04L 67/1095 |

| | | | | |
|---|---|---|---|---|
| 2009/0254572 A1 * | 10/2009 | Redlich | ................. | G06Q 10/10 |
| 2010/0250497 A1 * | 9/2010 | Redlich | ................. | G06Q 10/06 |
| | | | | 707/661 |
| 2012/0030167 A1 | 2/2012 | Appiah | | |
| 2012/0185448 A1 | 7/2012 | Mensch et al. | | |
| 2013/0139241 A1 | 5/2013 | Leeder | | |
| 2013/0159062 A1 * | 6/2013 | Stiehl | ..................... | G06Q 10/06 |
| | | | | 705/7.36 |

(Continued)

FOREIGN PATENT DOCUMENTS

| | | | | | |
|---|---|---|---|---|---|
| CN | 115063026 A | * | 9/2022 | ............... | F42D 1/00 |
| GB | 2375006 A | * | 10/2002 | ............. | A63F 13/12 |

(Continued)

OTHER PUBLICATIONS

Stefan Momma, Enterprise Content Management for SAP, Redbook,50 pages, Sep. 15, 2015. (Year: 2015).*

(Continued)

*Primary Examiner* — Luu T Pham
*Assistant Examiner* — Walter J Malinowski
(74) *Attorney, Agent, or Firm* — Fountainhead Law Group, PC

(57)          ABSTRACT

Embodiments of the present disclosure include techniques for storing and retrieving public data. In one embodiment, data for backend applications running on different landscapes are stored in an associated content management system. A landscape of a plurality of landscapes includes a public content management system. Data designated at public may be stored by content management systems residing on different landscapes in the public content management system. Requests for public data are routed by local content managements systems to the public content management system, which then responds with the public data requested.

20 Claims, 4 Drawing Sheets

(56) References Cited

U.S. PATENT DOCUMENTS

| | | | | |
|---|---|---|---|---|
| 2013/0191519 A1* | 7/2013 | Chang | G06F 9/5066 | |
| | | | 709/223 | |
| 2013/0262392 A1* | 10/2013 | Vibhor | G06F 16/178 | |
| | | | 707/654 | |
| 2014/0359576 A1* | 12/2014 | Rath | G06F 8/71 | |
| | | | 717/121 | |
| 2015/0074286 A1* | 3/2015 | Anschutz | H04L 45/38 | |
| | | | 709/240 | |
| 2015/0120649 A1 | 4/2015 | Nakadai | | |
| 2015/0236907 A1 | 8/2015 | Popli | | |
| 2016/0110828 A1* | 4/2016 | Master | G06Q 50/184 | |
| | | | 705/310 | |
| 2017/0195373 A1* | 7/2017 | Toh | H04N 7/15 | |
| 2018/0081905 A1 | 3/2018 | Kamath et al. | | |
| 2019/0303445 A1* | 10/2019 | Padmanabhan | G06F 16/27 | |
| 2020/0092177 A1 | 3/2020 | Marvin et al. | | |
| 2020/0118330 A1 | 4/2020 | Connelly et al. | | |
| 2020/0242481 A1* | 7/2020 | Kim | G06F 16/2468 | |
| 2021/0058447 A1 | 2/2021 | Trufasiu et al. | | |
| 2021/0109862 A1 | 4/2021 | Yang et al. | | |
| 2021/0134407 A1* | 5/2021 | Vera-Ciro | G06F 16/21 | |
| 2021/0168128 A1 | 6/2021 | Carru et al. | | |
| 2021/0385252 A1* | 12/2021 | Lebin | G06F 21/52 | |
| 2021/0399877 A1 | 12/2021 | Ohashi et al. | | |
| 2021/0406397 A1* | 12/2021 | Brazeau | G06F 21/6245 | |
| 2022/0027509 A1* | 1/2022 | Amico | H04W 12/02 | |
| 2022/0076240 A1* | 3/2022 | Ghani | G06Q 20/12 | |
| 2022/0086139 A1* | 3/2022 | Venkatesh | H04L 63/0861 | |
| 2022/0245290 A1* | 8/2022 | Luciani | G06F 16/2358 | |
| 2023/0007483 A1* | 1/2023 | Mueck | G06Q 50/265 | |
| 2023/0098596 A1* | 3/2023 | Karri | G06N 3/094 | |
| | | | 717/125 | |
| 2024/0069234 A1* | 2/2024 | Meenakshi Sundaram Gandhi .... | | |
| | | | G01V 1/30 | |
| 2024/0333822 A1* | 10/2024 | Parla | H04L 69/22 | |
| 2024/0419456 A1 | 12/2024 | Eberlein | | |

FOREIGN PATENT DOCUMENTS

| | | | | | |
|---|---|---|---|---|---|
| JP | 2008084182 A | * | 4/2008 | | |
| JP | 444518 B2 | * | 3/2024 | | H04L 63/04 |

OTHER PUBLICATIONS

Lomotey, Richard K., and Ralph Deters. "Reliable consumption of web services in a mobile-cloud ecosystem using REST." In 2013 IEEE Seventh International Symposium on Service-Oriented System Engineering, pp. 13-24. IEEE, 2013. (Year: 2013).*

The extended European search report of Application No. 24210027.9 dated May 12, 2025. 13 pages.

Bigstar: "Site to site transfers (FXP)—1-15 INV. Flash FXP Forums", H04L9/40, Apr. 22, 2014 (Apr. 22, 2014), pp. 1-2, XP093246533, The Way back machine Retrieved from the Internet: URL:https://web.archive.org/web/20140718041834/https://www.flashfxp.com/forum/flashf xp/frequently-asked-questions-faq-/14656-site-site-transfers-fxp.html [retrieved on Feb. 4, 2025].

Cppcis231: "How to FTP and FXP", 1-15, Mar. 5, 2012 (Mar. 5, 2012), XP093246544, Retrieved from the Internet: URL:https://www.youtube.com/watch?v=6XXQge RWWRw [retrieved on Feb. 4, 2025].

The extended European search report of Application No. 24206608.2 dated Mar. 10, 2025. 6 pages.

* cited by examiner

User → Tenant Frontend 301

Content Management System 302

Content Manager Service — 310

Content Manager DB Server — 311

Backend Application Server 303

Object datastore — 312

Database — 313

Data 304

Fig. 3A

Package Metadata info: Version etc.,
objects: [ Object 1,
          Object 2,
          .
          .          320
          .
          Object N]

| Object 1 | Object 2 | | Object N |
|---|---|---|---|
| Object Metadata 321a | Object Metadata 321b | ... | Object Metadata 321n |

Fig. 3B

```
{
  "info": {
    /* Package version information */
  },
  "objects": [
    {
      "objectType": "RESOURCE",
      "objectName": "Annual Reports",
      "objectId": "objectIdA",
      "parentResId": "PUBLIC",         321x
      "ancestorPath": [ ]
    },
    {
      "objectType": "RESOURCE",
      "objectName": "New Story",
      "objectId": "objectIdC",
      "parentResId": "objectIdB",
      "ancestorPath": [ ]
    },
    {
      "objectType": "RESOURCE",
      "objectName": "Finance Reports",
      "objectId": "objectIdB",
      "parentResId": "objectIdA",
      "ancestorPath": [ ]
    },
  ]
}
```

Fig. 3C

Create package 330 → Share package 331 → Import package 332

Fig. 3D

SYSTEMS AND METHODS FOR STORING AND RETRIEVING PUBLIC DATA

CROSS REFERENCE TO RELATED APPLICATIONS

This application is related to, and concurrently filed with, U.S. Patent Application Serial No. (Unassigned; entitled "SYSTEMS AND METHODS FOR PARALLEL TRANSPORT OF DATA BETWEEN COMPUTER SYSTEMS", naming Sahana Durgam Udaya and Suneel Sristi as inventors, filed on Dec. 6, 2023, the disclosure of which is hereby incorporated herein by reference.

This application is related to, and concurrently filed with, U.S. Patent Application Serial No. (Unassigned; entitled "SYSTEMS AND METHODS FOR AUTHORIZED MOVEMENT OF INFORMATION BETWEEN COMPUTER SYSTEMS", naming Sahana Durgam Udaya as inventor, on Dec. 6, 2023, the disclosure of which is hereby incorporated herein by reference.

This application is related to, and concurrently filed with, U.S. Patent Application Serial No. (Unassigned; entitled "SYSTEMS AND METHODS FOR SCHEDULING PACKAGES TO SYNCHRONIZE CONTENT ACROSS COMPUTER SYSTEMS", naming Sahana Durgam Udaya and Pranav Kumar as inventors, filed on Dec. 6, 2023, the disclosure of which is hereby incorporated herein by reference.

This application is related to, and concurrently filed with, U.S. Patent Application Serial No. (Unassigned; entitled "SYSTEMS AND METHODS FOR COPYING DATA BETWEEN COMPUTER SYSTEMS", naming Sahana Durgam Udaya, Soumya Basavaraju, Abhishek Nagendra, Ashokkumar Kandasamy Narayanan, and Mickey Wong as inventors, filed on Dec. 6, 2023, the disclosure of which is hereby incorporated herein by reference.

BACKGROUND

The present disclosure relates generally to moving data in computer systems, and in particular, to systems and method for storing and retrieving public data.

Computer systems require data to produce useful and meaningful results. Data preparation and analytics can involve complex, time consuming preparation of relations, visualizations, and compilations of data. When data is prepared in such a way, it may be beneficial to share the data across multiple computer systems. However, moving complex data structures across different systems can be a challenge. One particular challenge pertains to data that is used by many computer systems. Managing public data used by many computer systems can be computationally intensive and challenging to manage.

The present disclosure addresses these and other challenges and is directed to techniques for storing and retrieving public data across many computer systems.

BRIEF DESCRIPTION OF THE DRAWINGS

FIG. 3A illustrates an example system according to another embodiment.

FIG. 3B illustrates an example package according to an embodiment.

FIG. 3C illustrates an example data object according to an embodiment.

FIG. 3D illustrates a transport process according to an embodiment.

DETAILED DESCRIPTION

Described herein are techniques for storing and retrieving public data. In the following description, for purposes of explanation, numerous examples and specific details are set forth in order to provide a thorough understanding of some embodiments. Various embodiments as defined by the claims may include some or all of the features in these examples alone or in combination with other features described below and may further include modifications and equivalents of the features and concepts described herein.

Figure 1:
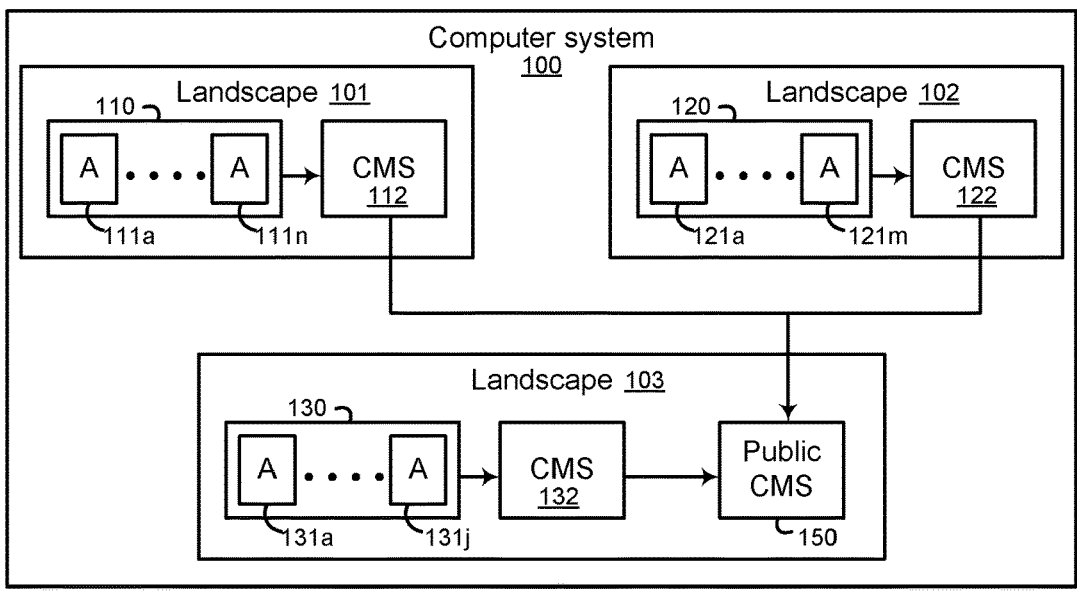
FIG. 1 illustrates a system for moving data across computer systems according to an embodiment.

FIG. 1 illustrates a computer system 100 according to an embodiment. Features and advantages of the present disclosure include techniques for managing public and private data. The present techniques may be applied to a wide range of applications. The present techniques are merely illustrative. The present techniques may be applied to a wide range of software systems deployed on a variety of architecture. For example, in some embodiments, computer system 100 may include on-prem deployments of applications, cloud deployments of applications, or combinations thereof. Computers may execute software applications directly or the computers may execute virtual machines that, in turn, execute software applications (or combinations thereof). In various embodiments, computers may reside in the same location or be spread out across geographic regions.

Computer system 100 may include numerous computers executing multiple software modules. Here, a user may interface with various backend applications through a frontend application of a software application, and the frontend may interface with a backend application. For example, user interaction with functionality of a backend application may be through the frontend, which may provide a user interface (e.g., a browser-based user interface). Backend applications may include software logic for performing a wide range of functions specific to the particular application and may further include a database system (not shown) for storing application data. Example backend applications include the Concur® software application and the Successfactors® software application by SAP®. Backend applications may support numerous frontends. A particular backend application may be deployed on multiple computer servers (e.g., backend application servers) to provide compute resources for potentially many users. Different instances of an application (frontends and backends) may be created for different groups of users (e.g., companies or other organizations) and are sometimes referred to as "tenants."

FIG. 1 shows multiple landscapes 101-103 comprising backend applications ("A") 111a-n, 121a-m, and 131a-j. A landscape may comprise instances of backend applications in a particular geographic region, for example, which may provide localized network connectivity for faster performance of the software. Applications in different landscapes may be associated with different content management systems ("CMS"). Here, backend applications 110 in landscape 101 are associated with CMS 112, backend applications 120 in landscape 102 are associated with CMS 122, and backend applications 130 in landscape 103 are associated with CMS 132. Content management systems may store data generated by users. For instance, a user of one application may generate a data set and/or analytic relationships between data and store the data on an associated content management system. The stored data may then be retrieved by other users who have access rights to the data. As mentioned above, certain backend applications may be associated with particular groups or users. Accordingly, in some embodiments, backend applications 111*a-n*, 121*a-m*, and 131*a-j* may correspond to different tenants. In some cases, different landscapes may have different tenants, and in other cases particular tenants may have backend application instances on many landscapes. Thus, data accessibility (access rights/privileges) may be limited based on a variety of factors.

For example, data belonging to different tenants is typically not accessible to other tenants. Data with limited access rights to a particular tenant or group is often referred to as "private" data. Private data is only accessible to members of the tenant or group. For example, users of tenant 1 on application 111*a* may create and store private data in CMS 112, and users of tenant 1 on application 121*a* on landscape 102 may be allowed to access the private data. Thus, private data for particular backend applications may comprise private data for tenants of the particular backend applications.

In other cases, a user may share data with particular other tenants or groups. Data with specified access rights to other particular tenants or groups is often referred to as "shared" data. For example, users of tenant 1 on application 111*a* may create and store data in CMS 112, which may be designated as shared data with another tenant (e.g., tenant 2). Accordingly, users of tenant 2 on an application on landscape 102 may be allowed to access the shared data. In some embodiments, when tenant 1 shares data with tenant 2, the data is packaged and sent to all landscapes where tenant 2 resides.

In yet other cases, a user may share data with all tenants or groups. Data with open access rights to all tenants or groups is often referred to as "public" data. For example, users of tenant 1 on application 111*a* may create and store data in CMS 112, which may be designated as public data. Accordingly, users of any other tenant on any other landscape may be allowed to access the public data. However, managing public data across backend landscapes and applications is computationally and organizationally challenging.

Features and advantages of the present disclosure include storing public data in dedicated public CMS 150 on a particular landscape. In this example, public CMS 150 resides on landscape 103. Generally, when public data is spread across multiple CMSs on different landscapes, or one CMS on a particular landscape is used for both public and non-public data, the computational loading on the CMS is relatively higher as compared to other landscapes because it has to cater to its own landscape requests (e.g., from tenants) for private and public package requests and requests from other landscape CMSs for public packages and/or shared or private packages. Further, an increase in the number of tenants being provisioned in on a particular landscape adds computational loading on the landscape's CMS. This impacts the user experience not just for the landscape users, but for other landscape users accessing public packages or shared private package on that landscape. This impacts resiliency of a landscape's CMS, resulting in response time degradation, and in some cases, an increase in failure rate.

Features and advantages of the present disclosure include storing private data on a local CMS and public data on a public CMS. For example, backend applications 111*a-n*, 121*a-m*, and 131*a-j* may store private data content management systems 112, 122, and 132, respectively, on landscapes 101-103. Each landscape includes associated content management systems 112, 122, and 132 for each backend applications 111*a-n*, 121*a-m*, and 131*a-j* on landscape 101, 102, and 103. Public data for backend applications 111*a-n*, 121*a-m*, and 131*a-j* may be stored in a public content management system 150 on landscape 103.

One example of storing public data may be as follows. A user of a particular backend application, 121*a*, may designate a particular data project as public through a frontend. Accordingly, backend application 121*a* on landscape 102 may receive an indication that particular data is public data. The public data may be sent from backend application 121*a* to CMS 122 associated with the landscape 102. CMS 122 may determine that the public data is to be forwarded to the public CMS 150 on landscape 103. Next, the public data is sent to the public CMS 150 on landscape 103.

Users may retrieve public data as follows. A user of a frontend system may cause backend application 111*a* to generate a request for public data. The request may be to access a particular project or visualization associated with public data, for example. The request is sent from backend application 111*a* to CMS 112 on the same landscape 101 as backend application 111*a*. In response to the request, CMS 112 determines if CMS 112 and the public CMS 150 are on a same landscape. In this case, CMS 112 is on landscape 101 and public CMS 150 are not on the same landscape. Accordingly, the request for public data is sent from CMS 112 on landscape 101 to the public CMS 150 on landscape 103. Public CMS 150 responds by sending the public data to CMS 112, and backend application 111*a* may access the public data from CMS 112, for example.

Alternatively, a user of a different frontend system may cause backend application 131*a* to generate a request for public data. This request is sent from backend application 131*a* to CMS 132 on the same landscape 103 as backend application 131*a*. In response to the request, CMS 132 determines if CMS 132 and the public CMS 150 are on a same landscape. Here, CMS 132 and public CMS 150 are on the same landscape 103. Accordingly, the request for public data is sent from CMS 132 to the public CMS 150 on landscape 103. Public CMS 150 responds by sending the public data to CMS 132, and backend application 131*a* may access the public data from CMS 132, for example.

Similarly, a user of a different frontend system may cause backend application 121*a* to generate a request for public data. This request is sent from backend application 121*a* to CMS 122 on the same landscape 102 as backend application 121*a*. In response to the request, CMS 122 determines if CMS 122 and the public CMS 150 are on a same landscape. Here, CMS 122 and public CMS 150 are not on the same landscape 103. Accordingly, the request for public data is sent from CMS 122 on landscape 102 to the public CMS 150 on landscape 103. Public CMS 150 responds by sending the public data to CMS 122, and backend application 121*a* may access the public data from CMS 122, for example.

Figure 2:
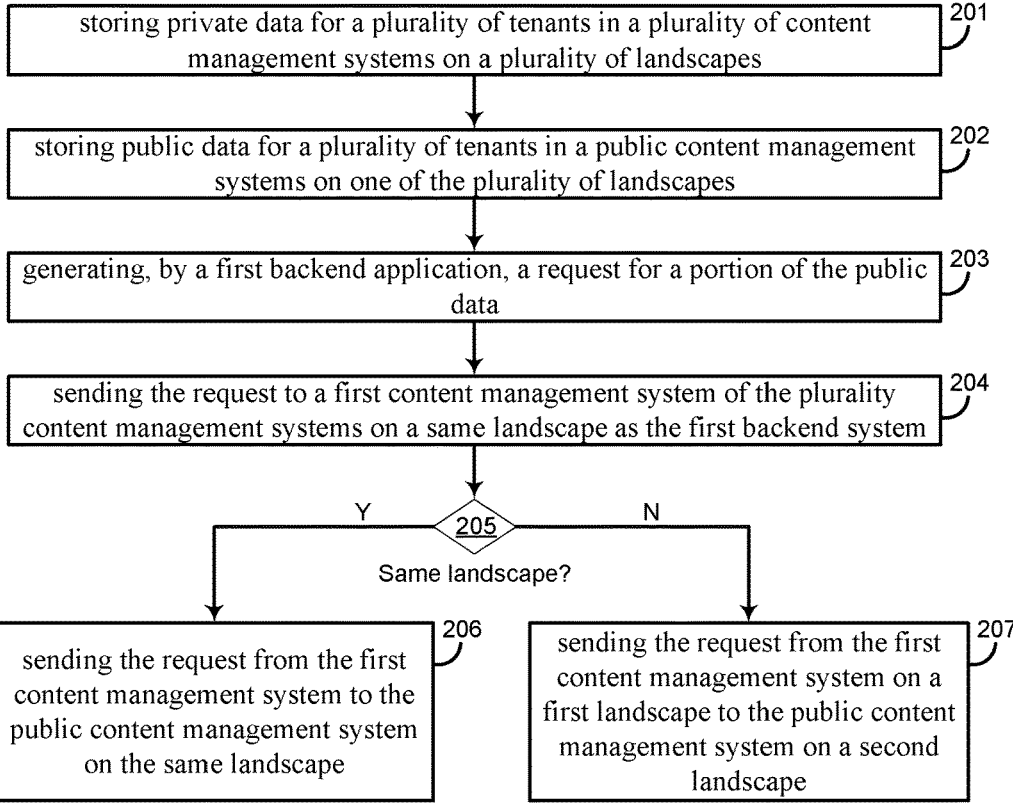
FIG. 2 illustrates a method of moving data across computer systems according to an embodiment.

FIG. 2 illustrates a method of moving data across computer systems according to an embodiment. At 201, private data is stored for a plurality of backend applications in a plurality of content management systems on a plurality of landscapes. Each landscape comprises a plurality of backend application servers for each backend application on a particular landscape and an associated content management system for each backend applications on the particular landscape. At 202, public data is stored for the plurality of backend applications in a public content management system on one of the plurality of landscapes. At 203, a request for a portion of the public data is generated by a first backend application of the plurality of backend applications. At 204, the request is sent to a first content management system of the plurality content management systems on a same landscape as the first backend application. At 205, the system determines if the first content management system and the public content management system are on a same landscape. The request is sent from the first content management system to the public content management system on the same landscape at 206 when the first content management system and the public content management system are on the same landscape. Alternatively, the request is sent from the first content management system on a first landscape to the public content management system on a second landscape at 207 when the first content management system and the public content management system are not on the same landscape.

FIG. 3A illustrates an example database system according to another embodiment. In this example, a user accesses a content management system 302 and backend application running on a server 303 over a tenant frontend 301. Content management system 302 includes a content manager service 310, content manager database (DB) server 311, object datastore 312, and database 313.

The present disclosure may be used in the context of an analytics content network in a cloud computer system that combines business intelligence (BI) and planning and predictive capabilities, for example. In any business intelligence application, the analytics content (model, story, visualizations, etc.) plays the central role in discovering the unseen patterns to boost the business productivity. Hence sharing of the analytics content across users is very helpful for better collaboration. Also, a standard content template can be reused by all users by plugging their corresponding data. An infrastructure for sharing the analytics content is sometimes referred to as an "Analytical Content Network" (ACN). The content entity that contains content to be shared is called "package."

ACN may be arranged in landscapes as a central component, all of which are connected. An application landscape is a coherent set of interconnected applications often within an enterprise, business, or organization, which are often associated with different geographical regions, for example. Logically ACN is "one global content network" which can provision or share any content with servers and users across landscapes. ACN may supports the following end-user workflows. A content creator creates content in the form of stories, models, dimensions, connections, Value-Driver Trees (VDT) etc. If authorized, the user can then export this content from a tenant (a portion of system resources securely assigned to a particular group) to ACN by creating a "content package," which can contain any number of these content items and share this with multiple other tenants, for example. Another SAC Content user can view all available content packages in their listing and import those packages relevant for their analytic workflows. This includes public content (Templates or Demo content) and private content (shared privately with them). To achieve sharing across tenants, the content is bundled in what is referred to as a "content package" (or just, package). A package may contain the details of each object present in the package, the dependency information between those objects, and an overview which summarizes the content details, for example. Data objects are stored in datastore 312 and data describing the data objects and packages may be stored in database 313, for example. An example package is shown in FIG. 3B comprising package metadata 320, and data objects 321a-n, which include object metadata, for example. An example data object 321x is shown in FIG. 3C.

Embodiments of the present disclosure may include three steps for transportation of data content and objects across tenants as shown in FIG. 3D. At 330, a source creates a package, at 331, the source shares the package to a destination, and at 332, the target imports the package.

Figure 4:
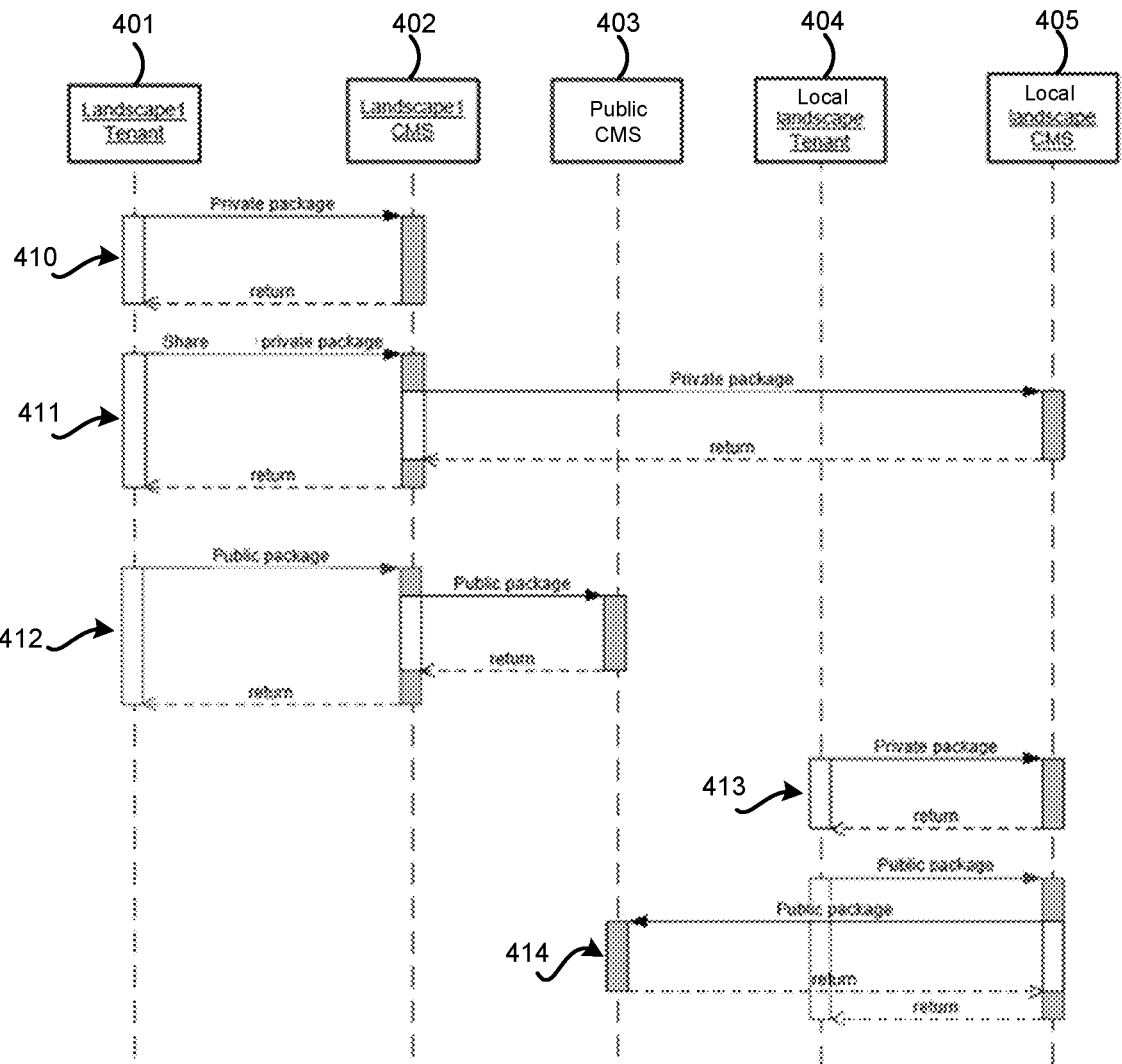
FIG. 4 illustrates a process for retrieving public and private data according to an embodiment.

FIG. 4 illustrates a process for retrieving public and private data according to an embodiment. FIG. 4 illustrates package movement between landscape1 tenant 401, landscape1 CMS 402, public CMS 403, local landscape tenant 404, and local landscape CMS 405. Public CMS 403, local landscape tenant 404, and local landscape CMS 405 may reside on the same landscape, which is a different landscape than landscape 1. Hence, "local" means public CMS 403, landscape tenant 404, and landscape CMS 405 are all local to the same landscape. At 410, landscape1 tenant 401 may store and retrieve packages on landscape1 CMS 402. At 411, landscape1 tenant 401 access a package shared by local landscape tenant 404. At 412, landscape1 tenant 401 sends and/or retrieves public packages with public CMS 403, which are sent to public landscape CMS 403 through landscape1 CMS 402. At 413, local landscape tenant 404 may retrieve a private package from local landscape CMS 405. At 414, local landscape tenant 404 sends and/or retrieves public packages with public CMS 403, which are sent to public landscape CMS 403 through local landscape CMS 405.

Figure 5:
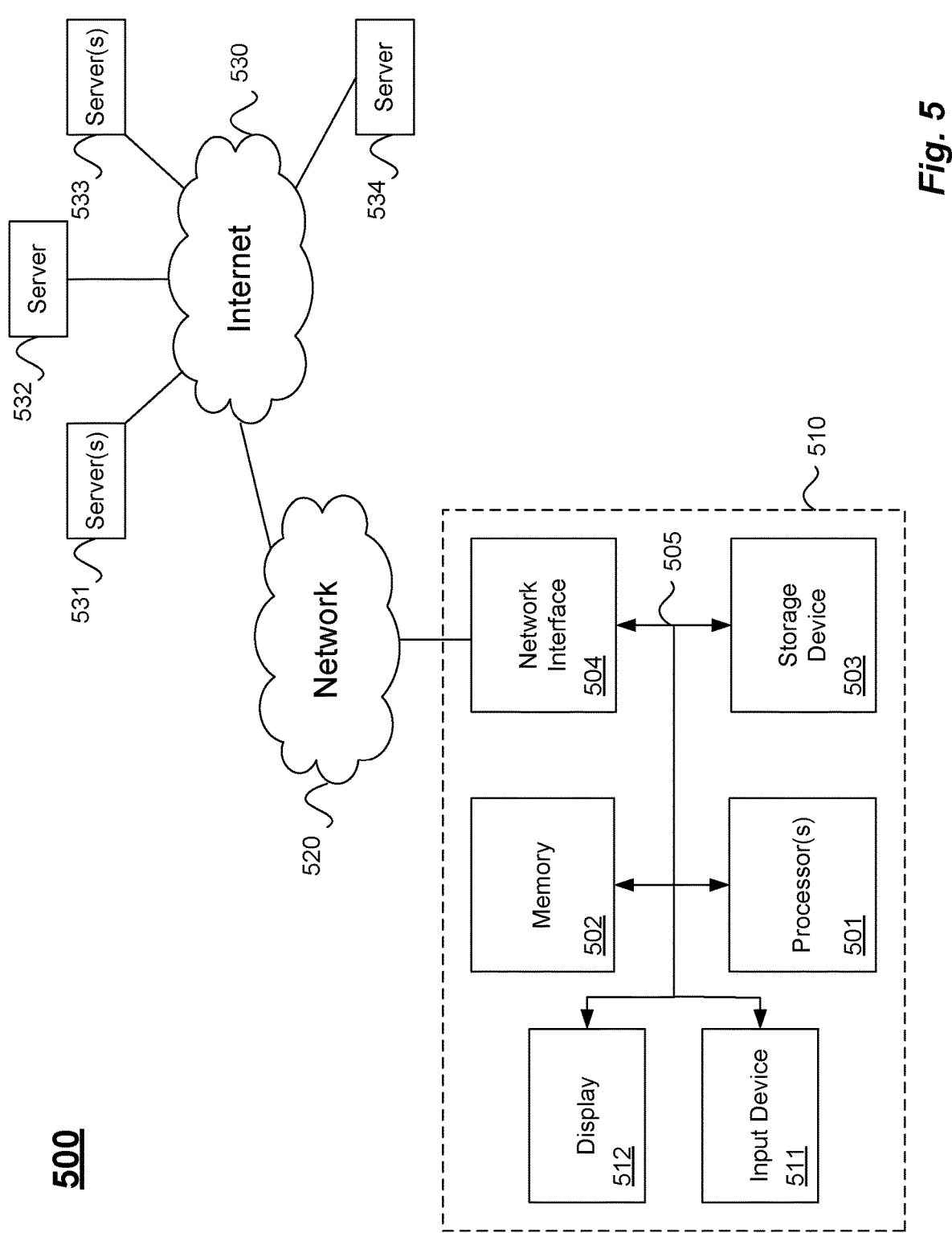
FIG. 5 illustrates hardware of a special purpose computing system configured according to the above disclosure.

FIG. 5 illustrates hardware of a special purpose computing system 500 configured according to the above disclosure. The following hardware description is merely one example. It is to be understood that a variety of computers topologies may be used to implement the above-described techniques. An example computer system 510 is illustrated in FIG. 5. Computer system 510 includes a bus 505 or other communication mechanism for communicating information, and one or more processor(s) 501 coupled with bus 505 for processing information. Computer system 510 also includes memory 502 coupled to bus 505 for storing information and instructions to be executed by processor 501, including information and instructions for performing some of the techniques described above, for example. Memory 502 may also be used for storing programs executed by processor(s) 501. Possible implementations of memory 502 may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, solid state disk, a flash or other non-volatile memory, a USB memory card, or any other electronic storage medium from which a computer can read. Storage device 503 may include source code, binary code, or software files for performing the techniques above, for example. Storage device 503 and memory 502 are both examples of non-transitory computer readable storage mediums (aka, storage media).

In some systems, computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses for coupling various components of the computer together, for example.

Computer system 510 also includes a network interface 504 coupled with bus 505. Network interface 504 may provide two-way data communication between computer system 510 and a local network 520. Network 520 may represent one or multiple networking technologies, such as Ethernet, local wireless networks (e.g., WiFi), or cellular networks, for example. The network interface 504 may be a wireless or wired connection, for example. Computer system 510 can send and receive information through the network interface 504 across a wired or wireless local area network, an Intranet, or a cellular network to the Internet 530, for example. In some embodiments, a frontend (e.g., a browser), for example, may access data and features on backend software systems that may reside on multiple different hardware servers on-prem 531 or across the network 530 (e.g., an Extranet or the Internet) on servers 532-534. One or more of servers 532-534 may also reside in a cloud computing environment, for example.

FURTHER EXAMPLES

Each of the following non-limiting features in the following examples may stand on its own or may be combined in various permutations or combinations with one or more of the other features in the examples below. In various embodiments, the present disclosure may be implemented as a system, method, or computer readable medium.

Embodiments of the present disclosure may include systems, methods, or computer readable media. In one embodiment, the present disclosure includes computer system comprising: at least one processor and at least one non-transitory computer readable medium (e.g., memory) storing computer executable instructions that, when executed by the at least one processor, cause the computer system to perform a method as described herein and in the following examples. In another embodiment, the present disclosure includes a non-transitory computer-readable medium storing computer-executable instructions that, when executed by at least one processor, perform a method as described herein and in the following examples.

In some embodiments, the present disclosure includes a method of moving data comprising: storing private data for a plurality of backend applications in a plurality of content management systems on a plurality of landscapes, each landscape comprising a plurality of backend application servers for each backend application on a particular landscape and an associated content management system for each backend applications on the particular landscape; storing public data for the plurality of backend applications in a public content management system on one of the plurality of landscapes; generating, by a first backend application of the plurality of backend applications, a request for a portion of the public data; sending the request to a first content management system of the plurality content management systems on a same landscape as the first backend application; determining if the first content management system and the public content management system are on a same landscape; and sending the request from the first content management system to the public content management system on the same landscape when the first content management system and the public content management system are on a same landscape, and sending the request from the first content management system on a first landscape to the public content management system on a second landscape when the first content management system and the public content management system are not on the same landscape.

In some embodiments, the method further comprising: generating, by a second backend application, a request for a portion of the public data; sending the request to a second content management system of the plurality content management systems on a same landscape as the second backend application; determining if the second content management system and the public content management system are on a same landscape; and sending the request from the second content management system to the public content management system on the same landscape when the second content management system and the public content management system are on a same landscape, and sending the request from the second content management system on a third landscape to the public content management system on the second landscape when the second content management system and the public content management system are not on the same landscape.

In some embodiments, storing public data comprises: receiving, on a third backend application of the plurality of backend applications, an indication that data is public data, the third backend application on a third landscape; sending the public data from the third backend application to an associated content management system on the third landscape; determining, by the associated content management system on the third landscape, that the public data is to be forwarded to the public content management system on the second landscape; and sending the public data to the public content management system on a second landscape.

In some embodiments, the landscapes are in different geographic regions.

In some embodiments, the private data for the plurality of backend applications comprises private data for a plurality of tenants on the plurality of backend applications.

In some embodiments, at least one of the plurality of backend applications and at least one of the plurality of content management systems is on a same landscape as the public content management system.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method of moving data comprising:

storing private data for a plurality of backend applications in a plurality of private content management systems on a plurality of landscapes, each landscape comprising a plurality of backend application servers for each backend application on a particular landscape and an associated content management system for each backend applications on the particular landscape, wherein the private data has limited access rights to a particular tenant or group and the private data for the plurality of backend applications comprises private data for a plurality of tenants on the plurality of backend applications;

storing public data for the plurality of backend applications in a public content management system on one of the plurality of landscapes, wherein the public data has open access rights to all the tenants or groups;

generating, by a first backend application of the plurality of backend applications, a request for a portion of the public data;

sending the request to a first content management system of the plurality of private content management systems on a same landscape as the first backend application;

determining if the first content management system and the public content management system are on a same landscape;

sending the request from the first content management system to the public content management system on the same landscape when the first content management system and the public content management system are on a same landscape, wherein the first backend application is on a first landscape tenant and the first content management system is a first landscape content management system; and sending the request from the first content management system on a first landscape to the public content management system on a second landscape when the first content management system and the public content management system are not on the same landscape.

2. The method of claim 1, further comprising:

generating, by a second backend application, a request for a portion of the public data;

sending the request to a second content management system of the plurality of private content management systems on a same landscape as the second backend application;

determining if the second content management system and the public content management system are on a same landscape;

sending the request from the second content management system to the public content management system on the same landscape when the second content management system and the public content management system are on a same landscape; and sending the request from the second content management system on a third landscape to the public content management system on a second landscape when the second content management system and the public content management system are not on the same landscape.

3. The method of claim 1, wherein storing public data comprises:

receiving, on a third backend application of the plurality of backend applications, an indication that data is public data, the third backend application on a third landscape;

sending the public data from the third backend application to an associated content management system on the third landscape;

determining, by the associated content management system on the third landscape, that the public data is to be forwarded to the public content management system on a second landscape; and sending the public data to the public content management system on the second landscape.

4. The method of claim 1, wherein the landscapes are in different geographic regions.

5. The method of claim 1, wherein at least one of the plurality of backend applications and at least one of the plurality of private content management systems is on a same landscape as the public content management system.

6. The method of claim 1, wherein the first landscape content management system is on a same landscape as the public content management system.

7. The method of claim 1, wherein the first landscape content management system is on a different landscape than the public content management system.

8. The method of claim 1, further comprising receiving the public data on the public content management system.

9. The method of claim 8, further comprising providing access to the public data to the first backend application.

10. A computer system comprising:

at least one processor;

at least one non-transitory computer readable medium storing computer executable instructions that, when executed by the at least one processor, cause the computer system to perform a method of moving of data comprising:

storing private data for a plurality of backend applications in a plurality of private content management systems on a plurality of landscapes, each landscape comprising a plurality of backend application servers for each backend application on a particular landscape and an associated content management system for each backend applications on the particular landscape, wherein the private data has limited access rights to a particular tenant or group and the private data for the plurality of backend applications comprises private data for a plurality of tenants on the plurality of backend applications;

storing public data for the plurality of backend applications in a public content management system on one of the plurality of landscapes, wherein the public data has open access rights to all the tenants or groups;

generating, by a first backend application of the plurality of backend applications, a request for a portion of the public data;

sending the request to a first content management system of the plurality of private content management systems on a same landscape as the first backend application;

determining if the first content management system and the public content management system are on a same landscape;

sending the request from the first content management system to the public content management system on the same landscape when the first content management system and the public content management system are on a same landscape, wherein the first backend application is on a first landscape tenant and the first content management system is a first landscape content management system; and sending the request from the first content management system on a first landscape to the public content management system on a second landscape when the first content management system and the public content management system are not on the same landscape.

11. The computer system of claim 10, further comprising:

generating, by a second backend application, a request for a portion of the public data;

sending the request to a second content management system of the plurality of private content management systems on a same landscape as the second backend application;

determining if the second content management system and the public content management system are on a same landscape;

sending the request from the second content management system to the public content management system on the same landscape when the second content management system and the public content management system are on a same landscape; and sending the request from the second content management system on a third landscape to the public content management system on a second landscape when the second content management system and the public content management system are not on the same landscape.

12. The computer system of claim 10, wherein storing public data comprises:

receiving, on a third backend application of the plurality of backend applications, an indication that data is public data, the third backend application on a third landscape;

sending the public data from the third backend application to an associated content management system on the third landscape;

determining, by the associated content management system on the third landscape, that the public data is to be forwarded to the public content management system on a second landscape; and sending the public data to the public content management system on the second landscape.

13. The computer system of claim 10, wherein the landscapes are in different geographic regions.

14. The computer system of claim 10, wherein at least one of the plurality of backend applications and at least one of a plurality of content management systems is on a same landscape as the public content management system.

15. The computer system of claim 10, wherein the method of moving data further comprises receiving the public data on the public content management system.

16. A non-transitory computer-readable medium storing computer-executable instructions that, when executed by at least one processor, perform a method of moving data, the method comprising:

storing private data for a plurality of tenants in a plurality of private content management systems on a plurality of landscapes, wherein landscapes are in different geographic regions, each landscape comprising a backend application server for each tenant on a particular landscape and an associated content management system for each tenant on the particular landscape, wherein the private data has limited access rights to a particular tenant or group and the private data for a plurality of backend applications comprises private data for a plurality of tenants on the plurality of backend applications;

storing public data for a plurality of tenants in a public content management system on one of the plurality of landscapes, wherein the public data has open access rights to all the tenants or groups;

generating, by a first backend application, a request for a portion of the public data;

sending the request to a first content management system of the plurality of private content management systems on a same landscape as a first backend system;

determining if the first content management system and the public content management system are on a same landscape;

sending the request from the first content management system to the public content management system on the same landscape when the first content management system and the public content management system are on a same landscape, wherein the first backend application is on a first landscape tenant and the first content management system is a first landscape content management system; and sending the request from the first content management system on a first landscape to the public content management system on a second landscape when the first content management system and the public content management system are not on the same landscape.

17. The non-transitory computer-readable medium of claim 16, further comprising:

generating, by a second backend application, a request for a portion of the public data;

sending the request to a second content management system of the plurality of private content management systems on a same landscape as the second backend application;

determining if the second content management system and the public content management system are on a same landscape;

sending the request from a second content management system to the public content management system on the same landscape when the second content management system and the public content management system are on a same landscape; and sending the request from the second content management system on a third landscape to the public content management system on a second landscape when the second content management system and the public content management system are not on the same landscape.

18. The non-transitory computer-readable medium of claim 16, wherein storing public data comprises:

receiving, on a third backend application of the plurality of backend applications, an indication that data is public data, the third backend application on a third landscape;

sending the public data from the third backend application to an associated content management system on the third landscape;

determining, by the associated content management system on the third landscape, that the public data is to be forwarded to the public content management system on a second landscape; and sending the public data to the public content management system on the second landscape.

19. The non-transitory computer-readable medium of claim 16, wherein the landscapes are in different geographic regions.

20. The non-transitory computer-readable medium of claim 16, wherein at least one of the plurality of backend applications and at least one of the plurality of private content management systems is on a same landscape as the public content management system.

* * * * *